No. 716,194. Patented Dec. 16, 1902.
L. A. CONN.
SUPPLEMENTARY LENS MOUNTING FOR SPECTACLES OR EYEGLASSES.
(Application filed Apr. 11, 1902.)
(No Model.)
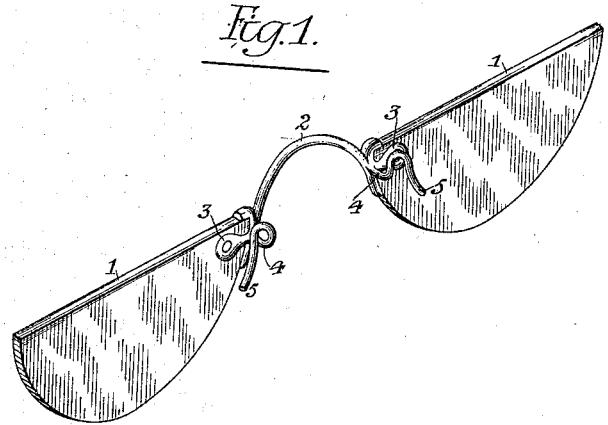
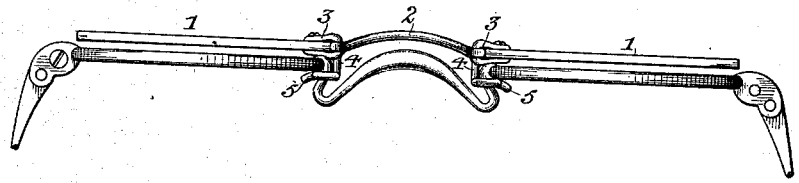
Witnesses:—
Frank L. A. Graham
Herman E. Metins
Inventor
Lydia A. Conn,
by his Attorneys
Howson & Howson

UNITED STATES PATENT OFFICE.

LYDIA A. CONN, OF PHILADELPHIA, PENNSYLVANIA.

SUPPLEMENTARY-LENS MOUNTING FOR SPECTACLES OR EYEGLASSES.

SPECIFICATION forming part of Letters Patent No. 716,194, dated December 16, 1902.

Application filed April 11, 1902. Serial No. 102,422. (No model.)

*To all whom it may concern:*

Be it known that I, LYDIA A. CONN, a citizen of the United States, residing in Philadelphia, Pennsylvania, have invented certain Improvements in Supplementary-Lens Mountings for Spectacles and Eyeglasses, of which the following is a specification.

The object of my invention is to so construct a supplementary-lens mounting for spectacles or eyeglasses that the same will be of a cheap and simple character, will be out of the way when the lenses are in use, and will permit of the application or removal of the supplementary lenses by simply dropping the mounting onto or lifting it from the nose-piece of the ordinary spectacles or the spring-posts of the eyeglasses.

In the accompanying drawings, Figure 1 shows a pair of half-lenses provided with a mounting in accordance with my invention for application to a pair of spectacles, and Fig. 2 is a view of the pair of spectacles with the supplementary lenses mounted thereupon.

The lenses 1 are connected by a nose-piece 2, secured to said lenses by clips 3 of the ordinary character, and from each of these clips projects inwardly a bar 4, terminating at its inner end in a laterally-bent hook 5 at the bottom, the free member of said hook being somewhat longer than the member which is connected to the bar 4 and being also by preference curved laterally to the right in the case of a right-hand hook and to the left in the case of a left-hand hook, as fully shown in Fig. 1.

In applying these supplementary lenses to the ordinary spectacles the hooks 5 are simply dropped onto those portions of the nose-piece which extend from the bow to the frames, as shown in Fig. 2, the hooks snugly fitting these portions of the nose-piece, so as to prevent lateral movement of the supplementary lenses in respect to the main lenses, while confinement of the frames of the spectacles between the hooks 5 and clips 3 prevents any movement of the supplementary lenses toward or from the main lenses.

Removal of the supplementary lenses can be effected by simply lifting them so as to free the hooks 5 from engagement with the nose-piece. In constructing the supplementary-lens mounting for application to eyeglasses a spring will be used in place of the rigid bow 2, and the hooks 5 will be so formed as to engage with the spring-posts or other convenient portion of the lens-mounting.

A mounting for supplementary lenses such as I have devised is entirely out of the way when the lenses are in place and is therefore not open to the objection of a mounting which engages with the temples of the spectacles, and the supplementary lenses can be more readily applied or removed than if they were provided with laterally-yielding spring-jaws for engaging with the inner portions of the spectacle-frames, as such laterally-engaging jaws require the employment of an elastic nose-piece in connection with the supplementary lenses, so that they can be moved toward each other in order to clear the frames of the spectacles and then permitted to expand in order to engage said frames. Besides permitting more ready application or removal of the supplementary lenses my improved mounting is of simpler and cheaper character than one such as I have just described.

The lengthening of the free member of the hook and the lateral bending of the lower end of the same serve to guide the supplementary mounting to its proper place upon the nose-piece, and thereby facilitate the application of the same.

Having thus described my invention, I claim and desire to secure by Letters Patent—

1. A supplementary-lens attachment for spectacles or eyeglasses, consisting of a supplementary-lens mounting and a pair of hooks projecting therefrom, and disposed so as to vertically engage the nose-piece or other central portion of the main-lens mounting, substantially as specified.

2. A supplementary-lens attachment for spectacles or eyeglasses, consisting of a supplementary-lens mounting and a pair of hooks projecting therefrom, said hooks being open at the bottom, and the free member of each hook being carried downwardly beyond the other member, substantially as specified.

3. A supplementary-lens attachment for spectacles or eyeglasses consisting of a supplementary-lens mounting and a pair of hooks projecting therefrom, said hooks being open at the bottom, and the free member of each hook being carried downwardly beyond the other member and bent laterally at its lower end, substantially as specified.

4. A supplementary-lens attachment for spectacles or eyeglasses consisting of a supplementary-lens mounting and a bar projecting inwardly therefrom in a direction substantially at right angles to the plane of the lens, said bar terminating in a laterally-bent hook open at the bottom, substantially as specified.

In testimony whereof I have signed my name to this specification in the presence of two subscribing witnesses.

LYDIA A. CONN.

Witnesses:
F. E. BECHTOLD,
JOS. H. KLEIN.